United States Patent
Chalmers et al.

(10) Patent No.: US 12,400,025 B1
(45) Date of Patent: Aug. 26, 2025

(54) TECHNIQUES FOR FACILITATING PRIVACY AND PROTECTION IN METAVERSES

(71) Applicant: UIPCO, LLC, San Antonio, TX (US)

(72) Inventors: Timothy Blair Chalmers, San Antonio, TX (US); Robert Lee Black, San Antonio, TX (US); Subhalakshmi Selvam, Allen, TX (US); Shayla Leigh Callis, Simi Valley, CA (US); Roberto Virgillio Jolliffe, San Antonio, TX (US); Timothy Benjamin Czerlinsky, Dallas, TX (US); Sean Michael Wayne Craig, San Antonio, TX (US)

(73) Assignee: UIPCO, LLC, San Antonio, TX (US)

( * ) Notice: Subject to any disclaimer, the term of this patent is extended or adjusted under 35 U.S.C. 154(b) by 190 days.

(21) Appl. No.: 18/101,837

(22) Filed: Jan. 26, 2023

(51) Int. Cl.
| | |
|---|---|
| H04L 9/30 | (2006.01) |
| G06F 21/60 | (2013.01) |
| G06F 21/62 | (2013.01) |
| H04L 67/306 | (2022.01) |
| H04W 12/02 | (2009.01) |

(52) U.S. Cl.
CPC .............................. *G06F 21/6245* (2013.01)

(58) Field of Classification Search
CPC ................................................ G06F 21/6245
See application file for complete search history.

(56) References Cited

U.S. PATENT DOCUMENTS

| | | | |
|---|---|---|---|
| 2023/0376625 A1 * | 11/2023 | Soryal ..................... | G06V 20/20 |
| 2023/0401312 A1 * | 12/2023 | Bakshi .................. | G06F 21/554 |
| 2024/0187235 A1 * | 6/2024 | Brid ........................... | H04L 9/30 |
| 2024/0221323 A1 * | 7/2024 | Mukherjee ............... | G06F 21/32 |

FOREIGN PATENT DOCUMENTS

| | | | | |
|---|---|---|---|---|
| WO | WO-2025012839 A1 * | 1/2025 | ............. | G06F 3/011 |

OTHER PUBLICATIONS

Dr. Facklasur Rahaman, Mohtasin Golam, Dr. Raihan Subhan, Esmot Ara Tuli, Dong-Seong Kim, Jae-Min Lee; "Meta-Governance Blockchain-Driven Metaverse Platform for Mitigating Misbehavior Using Smart Contract and AI", IEEE Transactions on Network and Service Management; Aug. 2024; pp. 4024-4038 (Year:2024).*

* cited by examiner

*Primary Examiner* — Shewaye Gelagay
*Assistant Examiner* — Courtney D Fields
(74) *Attorney, Agent, or Firm* — Fletcher Yoder, P.C.

(57) ABSTRACT

The embodiments described herein relate to systems and methods for managing or providing privacy in metaverses and/or to providing protection of a user within metaverses. In certain embodiments, a metaverse user privacy system may be used to prevent or discourage user data or private information from being compromised. Such limitations or prohibitions may be applied or enforced based on various factors, such as privacy or security settings specified by a user. In further aspects, the presently described techniques may facilitate protecting a user from known or suspected "bad" actors or from entering portions of the metaverse presenting risks to the user. Similarly, in further aspects the presently described techniques may be implemented as configurable parental controls, allowing a parent or guardian to configure or specify the types on interactions and risks a child may be exposed to in metaverses.

15 Claims, 12 Drawing Sheets

TECHNIQUES FOR FACILITATING PRIVACY AND PROTECTION IN METAVERSES

BACKGROUND

The present disclosure relates generally to systems and methods for facilitating privacy and/or protecting individuals in metaverses.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

The proliferation of metaverse-types virtual spaces and their use is increasing over time. As such, individuals are able to experience an ever-increasing number of virtual worlds. In practice, however, safeguards for protecting individual's (or organization's) privacy and/or data have lagged the overall technology allowing such virtual interactions. A consequence of the proliferation of such metaverses, therefore, is that users of such virtual spaces may inadvertently place information about themselves at risk or they may risk exposure to virtual spaces to which they are poorly prepared or suited or for which they are not interested in engaging. As such, there is a need to provide safeguards when engaging with such metaverses to protect individuals and their privacy as society relies more on the usage of such virtual spaces.

SUMMARY

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, a method is provided for providing privacy and protection within a metaverse. In accordance with certain embodiments, the method comprises monitoring, via a metaverse privacy and protection system implementing privacy and protection protocols, one or more attempted interactions attempted by a metaverse user within a metaverse. A determination is made, via the metaverse privacy and protection system, whether the one or more attempted interactions are permitted by the privacy and protection protocols. Based on a determination that the one or more attempted interactions are not permitted, the attempted interaction is prevented.

In certain embodiments, a method is provided for providing privacy and protection within a metaverse. In accordance with certain embodiments, the method comprises monitoring, via a metaverse privacy and protection system implementing privacy and protection protocols, the presence of other metaverse users within a respective virtual location of the metaverse in which a metaverse user is present. A determination is made, via the metaverse privacy and protection system, whether one or more of the other metaverse users meets a risk threshold and is within a proximity threshold. Based on a determination that the one or more of the other metaverse users meets the risk threshold and is within the proximity threshold, a notification or alert is provided to the metaverse user.

In certain embodiments, a method is provided for providing parental controls within a metaverse. In accordance with certain embodiments, the method comprises monitoring, via a metaverse privacy and protection system implementing parental control protocols, one or more attempted interactions attempted or performed by a metaverse user within a metaverse, wherein the metaverse user is a child having a parent or guardian. A determination is made, via the metaverse privacy and protection system, whether the one or more attempted interactions are permitted by the parental control protocols. Based on a determination that a respective attempted interactions is not permitted, the respected attempted interaction is prevented.

BRIEF DESCRIPTION OF THE DRAWINGS

Various aspects of this disclosure may be better understood upon reading the following detailed description and upon reference to the drawings in which.

DETAILED DESCRIPTION

Figure 1:
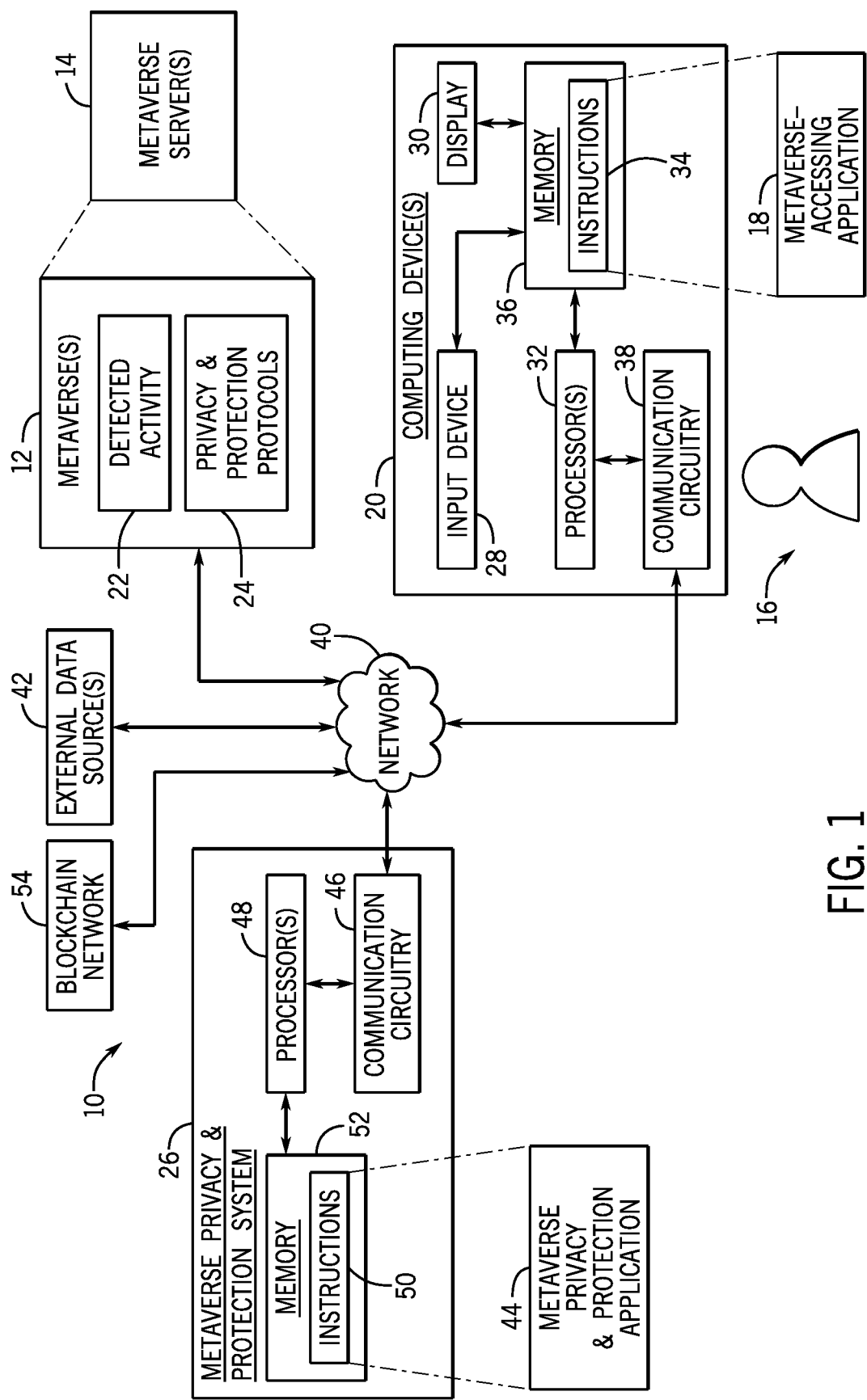
FIG. 1 is a schematic diagram of a metaverse generation system configured to enable interaction with metaverses, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

In the following description, for the purposes of explanation, numerous specific details are set forth in order to provide a thorough understanding of embodiments of the present disclosure. It will be apparent, however, to one skilled in the art that embodiments of the present disclosure may be practiced without some of these specific details.

As used herein, the term "application" refers to one or more computing modules, programs, processes, workloads, threads, and/or computing instructions executed by a computing system. Example embodiments of an application include software modules, software objects, software instances, and/or other types of executable code. As referred to herein, "user data" may include data or metadata associated with and/or identifying a user or which may be specific to an identified user. In certain embodiments, user data may include data or metadata that relates to the actions performed by the user while utilizing a computing device, and/or with information associated with and/or identifying the user. For example, user data may include an indication of actions performed by the user (e.g., a website opened, cookies, an application accessed, a file downloaded, a link associated with a product that the user selected, a rating performed by the user such as an upvote or like, home or office temperature setting, preferred shows, light settings, activities, activity patterns, etc.), user identity data (e.g., IP address, email, and the like), or demographic information of the user (e.g., age, race, location, and the like).

As used herein the term "metaverse" or "metaverses" may refer to a virtual space (e.g., a virtual reality space) in which users of or visitors to the virtual space can view of interact with a computer-generated environment as well as with other users or visitors to the virtual space. Typically, users access a metaverse via a network connection, such as the Internet. In practice, a metaverse may function as a fusion of physical, augmented, and virtual reality and may be public, private, or have a mixture of public and private aspects or features. Such metaverses may function as social spaces and/or may have other non-social aspects, such as related to a governmental, business, or other organizational purpose or context.

As used herein, terms "continuous" and "continuously" may refer to ongoing (e.g., iterative) actions that are performed without interruption or are performed with interruptions that take no longer than a relatively short period of time, such as no longer than a 5-second interruption between the ongoing actions, no longer than a 1-second interruption between the ongoing actions, and so forth. For example, continuous ongoing actions may be performed in an iterative manner such that there is no appreciable (e.g., human-perceivable) interruption of the iterative actions.

As used herein, the terms "automatic" and "automatically" refer to actions that are performed by a computing device or computing system (e.g., of one or more computing devices) without human intervention. For example, automatically performed functions may be performed by computing devices or systems based solely on data stored on and/or received by the computing devices or systems despite the fact that no human users have prompted the computing devices or systems to perform such functions. As but one non-limiting example, the computing devices or systems may make decisions and/or initiate other functions based solely on the decisions made by the computing devices or systems, regardless of any other inputs relating to the decisions.

The present disclosure relates generally to systems and methods for managing or providing privacy in metaverses and/or to providing protection of a user within metaverses. In particular, in certain embodiments, a metaverse user privacy system may be used to prevent or discourage user data or private information from being compromised, such as due to the interactions in which such data might be requested or exchanged. Such limitations or prohibitions may be applied or enforced based on various factors, such as privacy or security settings specified by a user or for the user (such as by a parent) as well as availability or accessibility of user data (or types of user data) or other private or confidential data associated with the user within the metaverse in question. In further aspects, the presently described techniques may facilitate protecting a user from known or suspected "bad" actors or from entering portions of the metaverse presenting risks to the user. Similarly, in further aspects the presently described techniques may be implemented as configurable parental controls, allowing a parent or guardian to configure or specify the types on interactions and risks a child may be exposed to in metaverses.

With the preceding in mind, and by way of providing a useful real-world context and background as to what a technical implementation of one or more metaverses may involve, FIG. 1 is a schematic diagram of a metaverse generation system 10 configured to enable interaction with various metaverses 12 that are maintained by various metaverse-providing entities, for example, via metaverse servers 14 that enable users 16 to interact with the metaverses 12 via metaverse-accessing applications 18 executable via computing devices 20 used by the users 16. In certain embodiments, the computing devices 20 may include any computing devices 20 configured to execute the metaverse-accessing applications 18 including, but not limited to, smart phones, computing tablets, personal computers (PCs), laptop computers, wearable computing devices, and so forth. In certain embodiments, each computing device 20 may be registered with the metaverses 12 by, for example, registering the computing device 20 (e.g., using a universally unique identifier (UUID), media access control (MAC) address, and so forth) with a user account (e.g., using a unique user identification number) associated with a particular user 16. Therefore, interaction with the metaverse-accessing application 18 by a particular user 16 via a particular computing device 20 may be automatically associated with that user 16.

For example, as described in greater detail herein, certain detected activity 22 of a particular user 16 within one or more metaverses 12 may be continuously monitored for the purpose of implementing one or more configurable privacy and/or protection schemas as discussed herein that help a user avoid unwanted information disclosures or transactions, avoid potentially criminal or anti-social actors within a metaverse 12, avoid suspect or risky regions of the metaverse(s) 12, and/or implement protective controls for potentially vulnerable or naïve users (e.g., children). In certain embodiments, the detected activity 22 may include the users 16 themselves manually entering data relating to characteristics of the users (e.g., by using one or more computing devices 20), entering into a commercial or financial transaction (e.g., a purchase), or may include activity of the users 16 within one or more metaverses 12, which may be automatically tracked and transmitted to a metaverse user privacy and protection system 26, which may in turn determine evaluate activities with respect to a protected user 16 as discussed herein.

The detected activity 22 of a particular user 16 with respect to particular metaverses 12 (e.g., which may be monitored by a metaverse-accessing application 18 being used by the particular user 16, by a metaverse 12 being accessed using the metaverse-accessing application 18 being used by the particular user 16, by a metaverse server 14 hosting the metaverse 12 being accessed using the metaverse-accessing application 18 being used by the particular user 16, or some combination thereof) may be transmitted to the metaverse user privacy and protection system 26, which uses the detected activity 22 to automatically implement the configurable privacy and/or protection protocols 24, as described in greater detail herein. For example, as will be appreciated, the metaverse-accessing application 18 being executed on a computing device 20 associated with the user 16 may be accessed by the user 16 to access a particular metaverse 12. In addition, the user 16 may initiate certain activity 22 with respect to the particular metaverse 12, as described in greater detail herein, via interaction with the metaverse-accessing application 18 using the computing device 20. For example, manipulation of one or more input devices 28 (e.g., keyboards, mice, buttons, touch screens, and so forth) of the computing devices 20 may enable the users 16 to interact with the metaverse-accessing application 18, which may be displayed on one or more displays 30 (e.g., light emitting diode (LED) displays, organic LED (OLED) displays, and so forth) of the computing devices 20. In certain embodiments, the users 16 may login to particular computing devices 20 such that user identifiers (e.g., user identification numbers) may be tracked to associate detected activity 22 with the particular user 16.

As illustrated in FIG. 1, in certain embodiments, the computing devices 20 may also include processing circuitry such as one or more processors 32 configured to execute instructions 34 stored in memory media 36 of the respective computing device 20, wherein the instructions 34, when executed by the one or more processors 32, enable the respective computing device 20 to track activity 22 (e.g., interaction with the metaverse-accessing application 18, as well as other web pages, applications, and so forth) of a user 16 using the respective computing device 20, as described in greater detail herein.

In certain embodiments, the one or more processors 32 of the computing devices 20 may be any suitable type of computer processors or microprocessors capable of executing computer-executable code. In certain embodiments, the memory media 36 of the computing devices 20 may be any suitable articles of manufacture that can serve as media to store processor-executable code, data, or the like. These articles of manufacture may represent computer-readable media (e.g., any suitable form of memory or storage) that may store processor-executable code (e.g., the instructions 34) executed by the one or more processors 32 to perform the presently disclosed techniques. In certain embodiments, the memory media 36 of the computing devices 20 may represent tangible, non-transitory computer-readable media (e.g., any suitable form of memory or storage) that may store the processor-executable code used by the one or more processors 32 to perform various techniques described herein. It should be noted that non-transitory merely indicates that the media is tangible and not a signal. It should be noted that the components described above with regard to the computing devices 20 are examples of components that may be found in a computing device, and the computing devices 20 may include additional or fewer components in certain embodiments.

In addition, in certain embodiments, the computing devices 20 may also include communication circuitry 38 configured to facilitate communication between the respective computing device 20 and the metaverse user privacy and protection system 26 (as well as with the metaverse server(s) 14) to facilitate interaction of the respective computing device 20 with the metaverses 12 described herein. For example, in certain embodiments, the computing devices 20 may transmit data relating to detected activity 22 with respect to metaverses 12 to the metaverse server(s) 14 and/or the metaverse user privacy and protection system 26 to facilitate interaction of users 16 associated with the computing devices 20 with the metaverses 12, as described in greater detail herein. In certain embodiments, the communication circuitry 38 may facilitate communications using Wi-Fi, near field communication, Bluetooth, Zigbee, radio frequency identification (RFID) tags and/or readers, an embedded wireless module, and/or another suitable wired or wireless communication network 40.

In addition, in certain embodiments, as described in greater detail herein, external data sources 42 may be used to collect data relating to users 16 that may be used by the metaverse server(s) 14 and/or the metaverse user privacy and protection system 26 to determine or facilitate protections or notifications implemented for or provided to a user 16 using the metaverse 12, as described in greater detail herein. In certain embodiments, the external data sources 42 may include, but are not limited to, social media sites, criminal history databases, merchants, financial institutions, rideshare apps, rental car companies, travel agencies, airlines, hospitality organizations, and so forth, which may be interacted with by the users 16, for example, either via applications (e.g., the metaverse-accessing application 18 or other applications) being executed on computing devices 20 associated with the user 16 or in person. As will be appreciated, commercial activity 22 or other interactions with these external data sources 42 or other external entities may also be communicated to the metaverse server(s) 14 and/or the metaverse user privacy and protection system 26 via the communication network 40.

In response to receiving data relating to detected activity 22 of a user 16 from one or more computing devices 20, metaverse servers 14, and/or external data sources 42, the metaverse user privacy and protection system 26 may utilize a metaverse user privacy and protection application 44 to analyze the data relating to the detected activity 22 to automatically implement or otherwise apply protection and/or privacy protocols with respect to the user 16 and other users 16 or entities of the particular metaverses 12, as described in greater detail herein.

In certain embodiments, the metaverse user privacy and protection system 26 may include communication circuitry 46 configured to facilitate communication between the metaverse user privacy and protection system 26 and the computing devices 20, the metaverse servers 14, and/or the external data sources 42, as described in greater detail herein. For example, as described in greater detail herein, in certain embodiments, the metaverse user privacy and protection system 26 may receive data relating to activity 22 of users 16 from one or more computing devices 20, one or more metaverse servers 14, and/or one or more external data sources 42 via the communication network 40, and may automatically privacy and/or protection protocols 24 configured for a given user 16 of the particular metaverses 12, as described in greater detail herein. In particular, the metaverse user privacy and protection system 26 may transmit the privacy and/or protection protocols 24 to the metaverse servers 14 to enable the metaverse servers 14 to implement the privacy and/or protection protocols 24 within the metaverses 12 maintained by the metaverse servers 14. In certain embodiments, the communication circuitry 46 may facilitate communications using Wi-Fi, near field communication, Bluetooth, Zigbee, radio frequency identification (RFID) tags and/or readers, an embedded wireless module, and/or another suitable wired or wireless communication network 40.

As illustrated in FIG. 1, in certain embodiments, the metaverse user privacy and protection system 26 may include other processing circuitry such as one or more processors 48 configured to execute instructions 50 stored in memory media 52 of the metaverse user privacy and protection system 26, wherein the instructions 50, when executed by the one or more processors 48, enable the metaverse user privacy and protection system 26 to perform the functions described in greater detail herein. In certain embodiments, the one or more processors 48 of the metaverse user privacy and protection system 26 may be any suitable type of computer processors or microprocessors capable of executing computer-executable code. In certain embodiments, the memory media 52 of the metaverse user privacy and protection system 26 may be any suitable articles of manufacture that can serve as media to store processor-executable code, data, or the like. These articles of manufacture may represent computer-readable media (e.g., any suitable form of memory or storage) that may store processor-executable code (e.g., the instructions 50) executed by the one or more processors 48 to perform the presently disclosed techniques.

In certain embodiments, the memory media 52 of the metaverse user privacy and protection system 26 may also be used to store data relating to detected activity 22 of users 16, as described in greater detail herein. In certain embodiments, the memory media 52 of the metaverse user privacy and protection system 26 may represent tangible, non-transitory computer-readable media (e.g., any suitable form of memory or storage) that may store the processor-executable code used by the one or more processors 48 to perform various techniques described herein. It should be noted that non-transitory merely indicates that the media is tangible and not a signal. It should be noted that the components described above with regard to the metaverse user privacy and protection system 26 are example components, and the metaverse user privacy and protection system 26 may include additional or fewer components in certain embodiments.

In addition, in certain embodiments, the metaverse user privacy and protection system 26 may function as an execution layer (e.g., as plug-in software) that any and all software applications interacting with the metaverses 12 may utilize to enable the metaverse user privacy and protection system 26 to capture metaverse activity 22 and determine privacy and/or protection protocols 24 and/or instructions based on such configurable protocols to transmit back to the metaverses 12, as described in greater detail herein. Indeed, in certain embodiments, the metaverse user privacy and protection system 26 may be deployed as a cloud-based metaverse user affiliation network to facilitate decentralized management of the metaverse user affiliations described herein.

As such, a metaverse-accessing application 18 being executed on a computing device 20 associated with a particular user 16, various metaverse servers 14, and/or external data sources 42 may monitor activity 22 of the particular user 16, and the data relating to this monitored activity 22 may be used by the metaverse user privacy and protection system 26 to automatically implement privacy and/or protection protocols 24 relevant to a given context (e.g., location within the respective metaverse 12, proximity to certain other users within the metaverse 12, engaging in certain transactions or communications within the metaverse 12, and so forth), as described in greater detail herein. For example, in certain embodiments, the data relating to the monitored activity 22 of the user 16 may include interactions that the user 16 has performed in a particular metaverse 12 with which the user 16 is currently interacting via the metaverse-accessing application 18. In addition, in certain embodiments, the data relating to the monitored activity 22 of the user 16 may include external data from the external data sources 42 relating to other users 16 within the metaverse 12 (e.g., prior reported antisocial or criminal conduct), entities within the metaverse 12 (e.g., fraudulent or fake entities, and so forth), or locations within the metaverse 12 (e.g., problematic or fake storefronts, and so forth).

It will be appreciated that the metaverse data transmitted by the metaverse user privacy and protection system 26 to metaverse servers 14 to enable the metaverse servers 14 to implement the privacy and protection protocols 24 in the metaverses 12 maintained by the metaverse servers 14 may include specific virtual objects to be presented, specific locations within the metaverses 12 to be blocked or for which notifications are presented, specific time periods (e.g., schedules) during which the privacy and/or protection protocols are implemented, specific data (e.g., warnings, notifications, tutorials, and so forth) to be presented in connection with virtual objects, other users, and/or virtual locations, specific interactions (e.g., transactions) that should be limited or prohibited based on the users involved and/or locations, and so forth. In addition, the metaverse data that is transmitted to metaverse servers 14 by the metaverse user privacy and protection system 26 may be determined in accordance with rules set by the metaverse servers 14. For example, certain metaverses 12 may be allowed by the metaverse servers 14 to implement privacy and/or protection protocols only in certain virtual areas within the metaverses 12 maintained by the metaverse servers 14. As such, the metaverse data transmitted by the metaverse user privacy and protection system 26 must comply with these restrictions.

Figure 2:
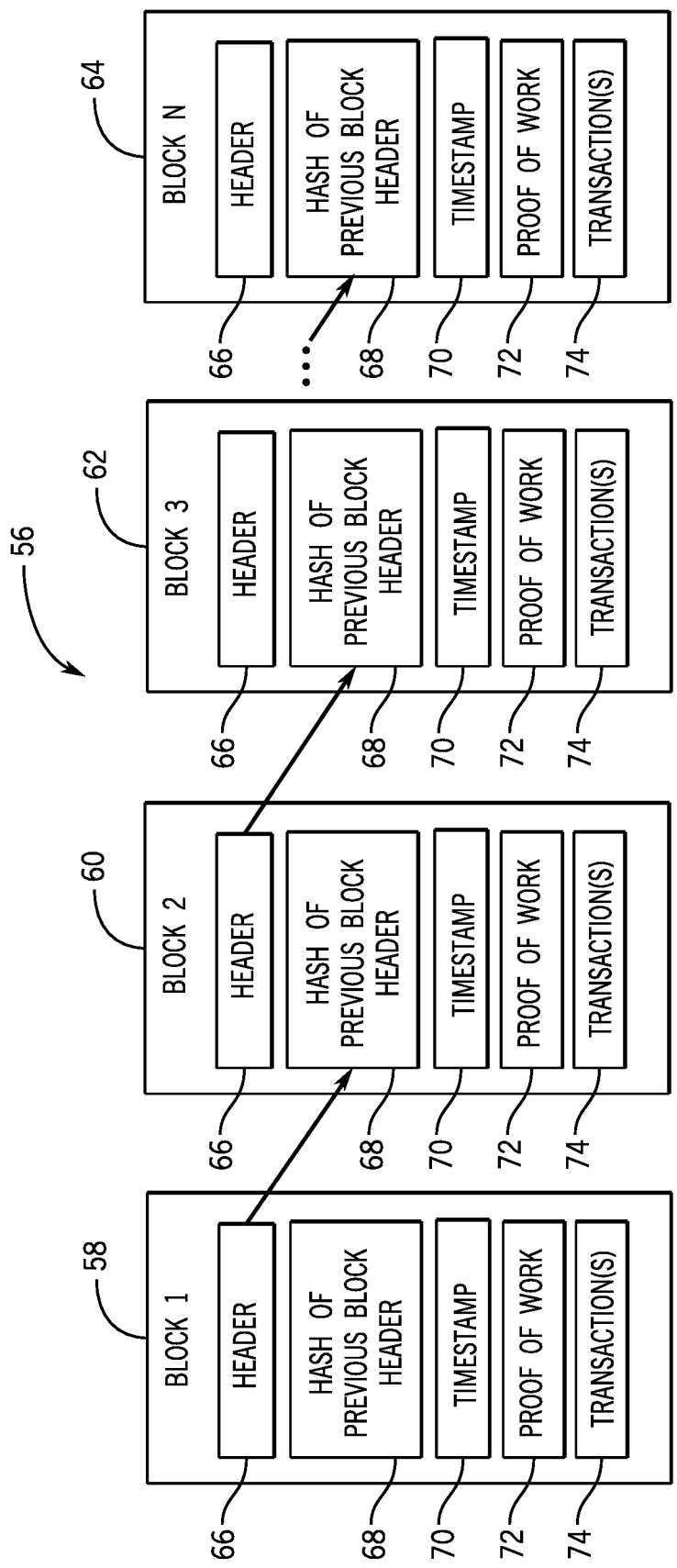
FIG. 2 illustrates a block diagram of a blockchain of a blockchain network of FIG. 1, in accordance with embodiments described herein.

As described in greater detail herein, any and all of the data received, generated, and/or transmitted by the metaverse user privacy and protection system 26 described herein may be stored by the metaverse user privacy and protection system 26 in a distributed ledger (e.g., a blockchain network) 54. FIG. 2 illustrates a block diagram of a blockchain 56 of the blockchain network 54 of FIG. 1. In the illustrated embodiment, the blockchain 56 is illustrated as having multiple blocks 58, 60, 62, and 64. The block 58 (first block in the blockchain 56) may have been created and allocated as a special starting block. The block 58 may include a unique header 66 uniquely identifying the block 58 from other blocks in the blockchain 56. Because the block 58 is the first block in the blockchain 56, a hash of a previous block header 66 may be set to zero. A timestamp 70 may include the date of creation for the block 58, and a proof of work section 72 may include certain "work" that proves that a "miner" has performed work suitable for the creation of the block 58 and/or to verify transactions in the blockchain 56. The work section 72 may vary based on a protocol used to create the blockchain 56. For example, a bitcoin protocol may use a Merkle tree. The Merkle tree may be a tree data structure in which every leaf node is labelled with a hash (e.g., one-way hash) of a data block, and every non-leaf node is labelled with a cryptographic hash of the labels of its child nodes. Because of the one-way transformation used in hashing, the Merkle tree has the property that there is no known technique that a deceptive party could use to guess a value that would hash with a second-to-last value to create the Merkle root, which is know from a verified blockchain 56, and so on, down the tree. In other words, there is no way to create a fake value that would hash to an expected Merkle tree value (e.g., value stored in work section 72 of the block 58), thus creating a single value that proves the integrity of all of the transactions under it. Transactions, such as transactions relating to interaction with the metaverses 12 described herein, may be stored in a transactions section 74. Data related to the particular transaction may also be stored in section 74 (or in another section).

When a new block is created, the block will receive a new header 66 uniquely identifying the new block. As described in greater detail herein, a peer-to-peer network may include multiple "miners" that add blocks to the blockchain 56 based on the blockchain protocol. In general, multiple miners validate transactions 74 that are to be added to a block, and compete (e.g., perform computing work, as introduced above) to have their respective block added to the blockchain 56. Validation of transactions includes verifying digital signatures associated with respective transactions 74. For a block to be added to the blockchain 56, a miner must demonstrate a proof of work before their proposed block of transactions is accepted by the peer-to-peer network, and before the block is added to the blockchain 56. In certain embodiments, a blockchain protocol include a proof of work scheme (e.g., Merkle Tree) that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In certain embodiments, the hash value is a one-way hash value such that the output hash value cannot be "unhashed" to determine what the input was. In certain embodiments, the blockchain protocol may require multiple pieces of information as input to the CHF. For example, the input to the CHF may include a reference to the previous (most recent) block (e.g., hash 68) in the blockchain 56, details of the transaction(s) 74 that are to be included in the to-be-created block, and a "nonce" value (e.g., a random number used only once).

Multiple nodes may compete to hash a set of transactions, and to provide the next block that is to be added to the blockchain 56. In certain embodiments, the blockchain protocol may provide a threshold hash to qualify a block to be added to the blockchain 56. For example, the threshold hash may include a predefined number of zeros (0s) that the hash value must have at the beginning (e.g., at least the first four characters of the hash value must each be zero). The higher the number of zeros, the more computationally time-consuming it may be to arrive at a qualifying hash value.

In accordance with the blockchain protocol, each miner in the peer-to-peer network receives transaction information for one or more transactions that are to be included in a block that is to be added next in the blockchain 56. Each miner provides the reference to the previous (most recent) block in the blockchain 56, details of the transaction(s) 74 that are to be included in the to-be-created block, and the nonce value to the CHF that may then be used to provide a hash value. If the hash value does not meet the threshold hash (e.g., the first four characters of the hash value are not each zero), the miner starts again to provide another hash value, thus increasing the amount of work. Alternatively, if the hash value meets the threshold hash (e.g., at least the first four characters of the hash value are each zero), the respective miner may have successfully created the next block that is to be added to the blockchain 56. Consequently, the respective miner's block is broadcast across the peer-to-peer network. At this point, all other miners cease work (because one miner was already successful), and all copies of the blockchain 56 are updated across the peer-to-peer network to append the block to the blockchain 56. Each miner may produce hundreds of thousands (or more) of hash values, before any one miner provides a qualifying hash value (e.g., at least the first four characters of the hash value are each zero).

It is to be noted that any computing device 20 may be miners. Accordingly, for example, as new data is created, new blocks may be added to the blockchain 56, including blocks 58, 60, 62, and 64. Indeed, the blockchain 56 may continue to grow, storing new data as it becomes available. Because of the distributed nature of the peer-to-peer network created via the blockchain network 54, each node may include copies of the blockchain 56 and share copies of the blockchain 56 as new peers enter the peer-to-peer network. Each copy of the blockchain 56 may include verified information for all or substantially all of the data tracked by the blockchain network 54. The information is secure, immutable, and more efficiently tracked as new added gets added via the blockchain network 54.

Figure 3:
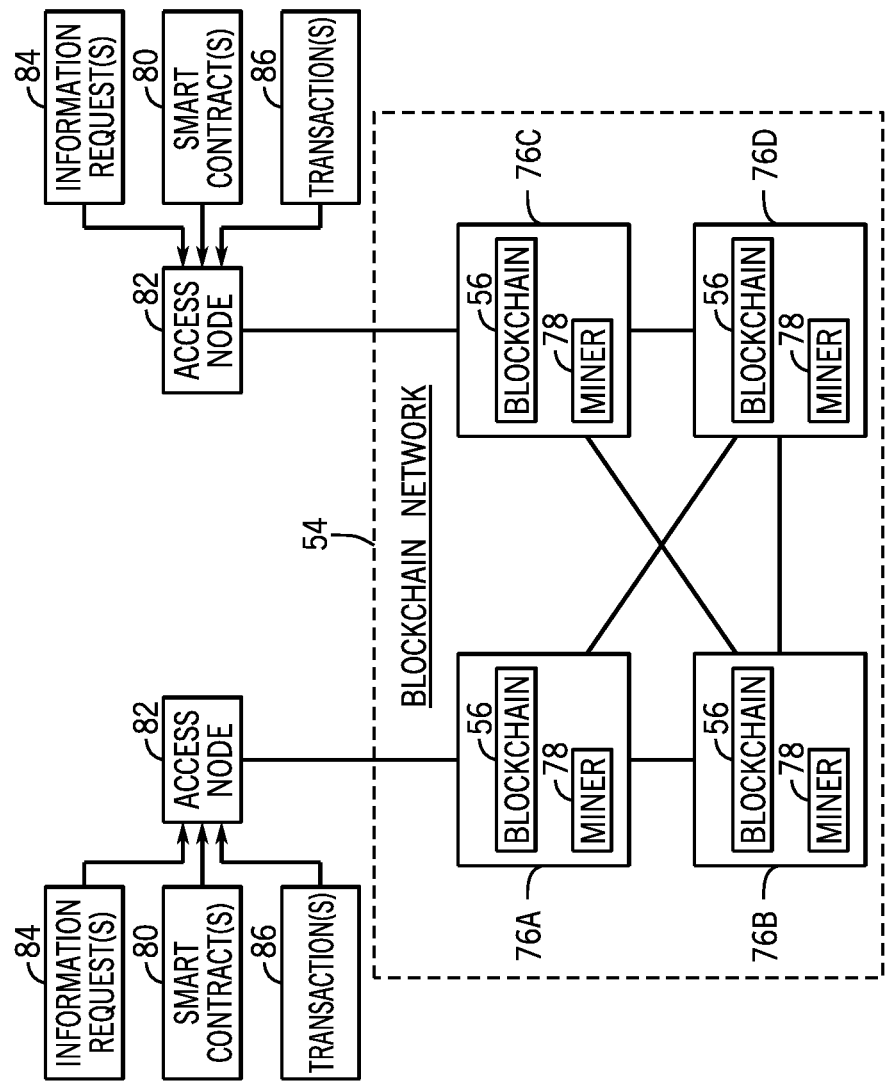
FIG. 3 illustrates a block diagram of a portion of the metaverse generation system of FIG. 1, which may be used to manage data relating to users and locations within metaverses using a distributed ledger (e.g., blockchain network), in accordance with embodiments described herein.

FIG. 3 illustrates a portion of the metaverse generation system 10 of FIG. 1, which may be used to manage data relating to metaverses 12 using a distributed ledger (e.g., blockchain network) 54, in accordance with embodiments described herein. As described herein, the blockchain network 54 may be formed by several blockchain nodes, such as blockchain nodes 76A, 76B, 76C, and 76D, which may be implemented by a dedicated server or computer device, or may be implemented as a virtual machine in a shared computer system. Each blockchain node 76A-D may have in its memory a replicate of the blockchain 56. Each blockchain node 76A-D may also have a miner 78, an application that may verify the integrity of the blockchain 56, and may also perform operations and/or transactions using smart contracts 80 associated with the blockchain 56. As described herein, the blockchain 56 is a replicated data structure that may have its consistency and integrity preserved by a consensus mechanism performed by the miners 78.

Users may interact with the blockchain network 54 via an access node 82. For example, users may request, through the access node 82, the recordation and/or processing of data (e.g., using a smart contract 80), such as an information request 84 (e.g., a request for the state of a smart contract 80), or a transaction request 86 (e.g., a request for a change in a state of the smart contract 80) to the blockchain 56. The smart contracts 80, information requests 84, and/or transaction requests 86 allow users to record certain data relating to interaction with the metaverses 12 described herein. Each access node 82 may be implemented by a computer terminal coupled to the blockchain network 54.

A miner 78 from any of the blockchain nodes 76A, 76B, 76C, and 76D may create an update to the blockchain 56. In certain embodiments, the smart contract(s) 80 may be a data structure that may include states (e.g., internal states) and transaction instructions relating to the data stored in the blockchain 56. The transactions, or functions, may include instructions that modify the states of the smart contracts 80 and/or interact with other smart contracts 80 by performing further transactions. Examples of smart contracts 80 described herein include smart contracts 80 related to storing data relating to interaction with the metaverses 12 described herein. Following insertion of a smart contract 80, the blockchain node 76 may propagate its update of the blockchain 56, and the other blockchain nodes 76 may accept the update using a consensus mechanism (e.g., proof of work, proof of stake, and so forth). For example, if blockchain node 76A generated a blockchain segment that incorporates some smart contract 80 to the blockchain 56, blockchain node 76A may propagate the updated blockchain 56 to blockchain nodes 76B, 76C, and 76D, which may validate and accept the updated blockchain 56.

Similarly, a transaction request 86 may be received by any miner 78 of the blockchain nodes 76A, 76B, 76C, and 76D via an access node 82. The transaction request 86 may perform operations that cause a change in the state of a smart contract 80 recorded in the blockchain 56. After performing the desired operations, and changing the state of the smart contract 80, in accordance with the transaction request 86, the miner 78 may update the blockchain 56 to record the updated state of the smart contract 80. The updated state of the smart contract 80 may be propagated to the blockchain nodes 76A-D, verified, and persisted using consensus mechanisms. An information request 84, similar to a transaction request 86, may be received by a miner 78, and may perform operations associated with a smart contract 80. However, in contrast with the transaction request 86, the information request 84 does not lead to changes in the state of the smart contract 80 and, thus, updates to the blockchain 56 that result from a successful information request 84 are not performed.

In certain embodiments, performance of the operations by the miners 78 of the blockchain nodes 76 may be incentivized and/or regulated by exchange of tokens (e.g., currencies) of the blockchain 56. For example, in public blockchains, updates to the blockchain 56 by a blockchain node 76A-D may be rewarded with a blockchain token. Moreover, performance of a transaction request 86 or an information request 84 may be rewarded with a blockchain token. For example, in certain embodiments, in the Ethereum public blockchain, updates to the blockchain from recordation of smart contracts 80 and information requests 84 may be rewarded with Ether tokens, and performance of transaction requests 86 and information requests 84 may be incentivized by offers of Ethers in the form of a secondary token called "gas". In certain private blockchain embodiments, tokens may be used to implement prioritization mechanisms for the operations and/or to prevent large or faulty operations from blocking the blockchain 56 with arbitrarily long operation times.

As described above, the embodiments described herein enable implementation of privacy and/or protection protocols in metaverses 12. In particular, in certain embodiments, a metaverse user privacy and protection system 26 may be used to implement limitations on action or transactions a user may perform within the metaverse 12, to identify "bad" actors or locations within the metaverse 12 (such as based on built-in (i.e., non-configurable) rules sets or based on user configured settings and preferences), to provide notifications or alerts based on the privacy or protection protocols 24, and/or to implement privacy or protection rules or protocols in the context of parental controls, as described in greater detail herein.

Figure 4:
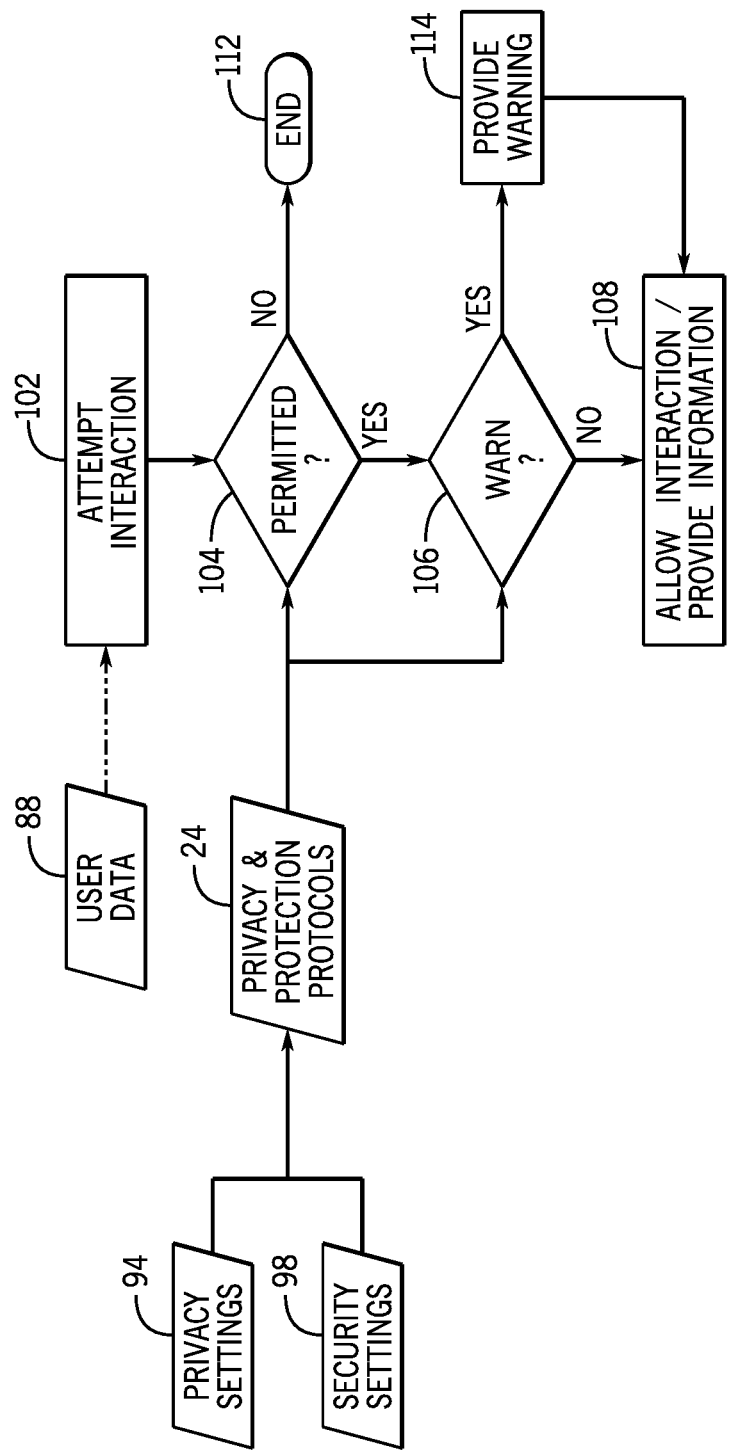
FIG. 4 depicts a process flow for implementing privacy and protection protocols within a metaverse, in accordance with embodiments described herein.

For example, as illustrated in the process flow of FIG. 4, a high-level example is provided that is applicable to systems and methods for managing or providing privacy in a metaverse 12 and/or to providing protection of a user 16 within metaverses 12. In particular, in certain embodiments, a metaverse user privacy system may be used to prevent or discourage user data 88 (e.g., name data, address data, payment or credit data, password data, demographic data (e.g., gender, age, age, date of birth, marital status, and so forth), historical data (e.g., place of birth, educational attainment, educational institutions, and so forth), or otherwise private information from being compromised, such as due to the interactions (e.g., commercial transactions or personal interactions) in which such user data 88 might be requested or exchanged. Such limitations or prohibitions may be applied or enforced as part of implemented privacy and protection protocols 24 based on various factors, such as, but not limited to: privacy settings 94 or security settings 98 specified by policy or by a user or for the user (such as by a parent) as well as availability or accessibility of user data 88 (or types of user data) or other private or confidential data associated with the user within the metaverse 12 in question.

By way of example, such prohibitions or limitations may come into play in an interaction context, such as the purchase or sell of a good or virtual good or service within the metaverse 12, where one party is requesting or requiring information (such as payment or identity information) that may be stolen or misused. Such a request is illustrated in FIG. 4 as an attempted interaction (step 102), such as a credit-based sale transaction. In such an instance, a user 16 may be prohibited, limited, or warned from entering into or otherwise engaging in such transactions, as may be determined as decision blocks 104 and 106 in view of the privacy and protection protocols 24, which may be parameterized based on the preset or user-configured privacy settings 94 and/or security settings 98. If, based on the protocols 24, the interaction (and corresponding exchange or release of user data 90) is permitted, the interaction may be allowed and the user data 88 is exchanged or released (step 108). Conversely, if a determination is made that the release or exchange of the user data 90 is not permitted based on the protocols 24, the interaction is prevented or terminated (end block 112).

In the depicted example, a further, optional evaluation is depicted as occurring in the circumstance where the interaction or transaction is permitted. In this circumstance, a further decision (decision block 106) is performed in which a user 16 may still be warned of a risk to the interaction even though the interaction is permitted, thereby allowing the user to make an informed decision as to whether to proceed or not. In this context, based on the privacy and protection protocols 24, a decision may be made to warn or not warn the user as to potential risks. If, per the protocols 24, no warning is justified, the interaction may proceed and/or the information in question provided. Conversely, if, per the protocols, the transaction is allowable but a warning, notification, or confirmation is justified, a warning, notification, or confirmation prompt may be displayed and/or audibilized prior to the interaction proceeding, thereby allowing the user 16 an opportunity to avoid the transaction. As noted in the preceding, such a notification may take the form of a confirmation prompt to which the user in question must respond in the affirmative to proceed. With this in mind, it may be appreciated that separate and discrete tolerances or thresholds may be provided as to whether an interaction might be allowed but also as to whether a warning, notification, or confirmation prompt is provided even if the interaction is allowed.

Figure 5:
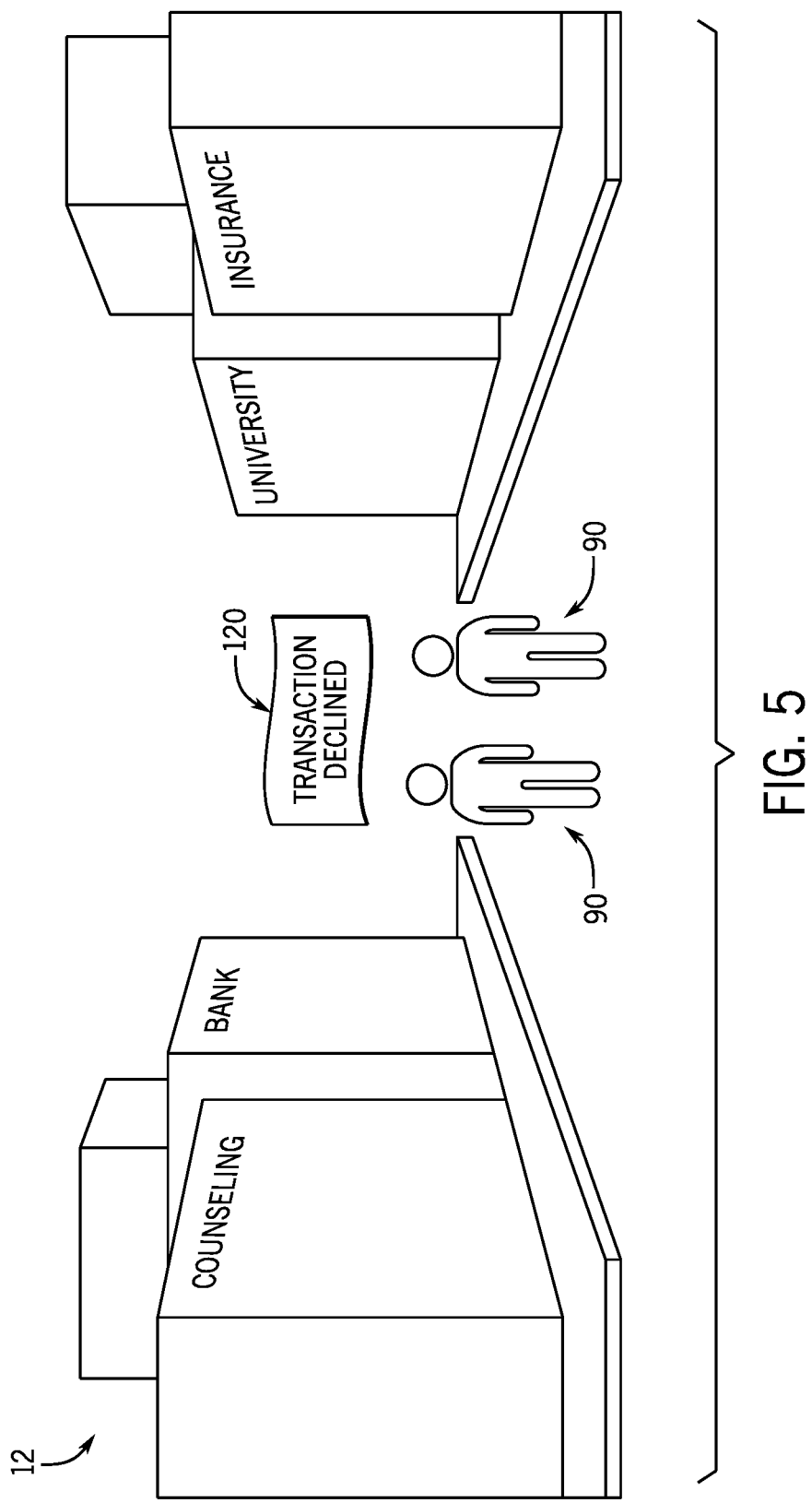
FIG. 5 illustrates a virtual message being presented to a metaverse user based on a prohibited interaction, in accordance with embodiments described herein.
Figure 6:
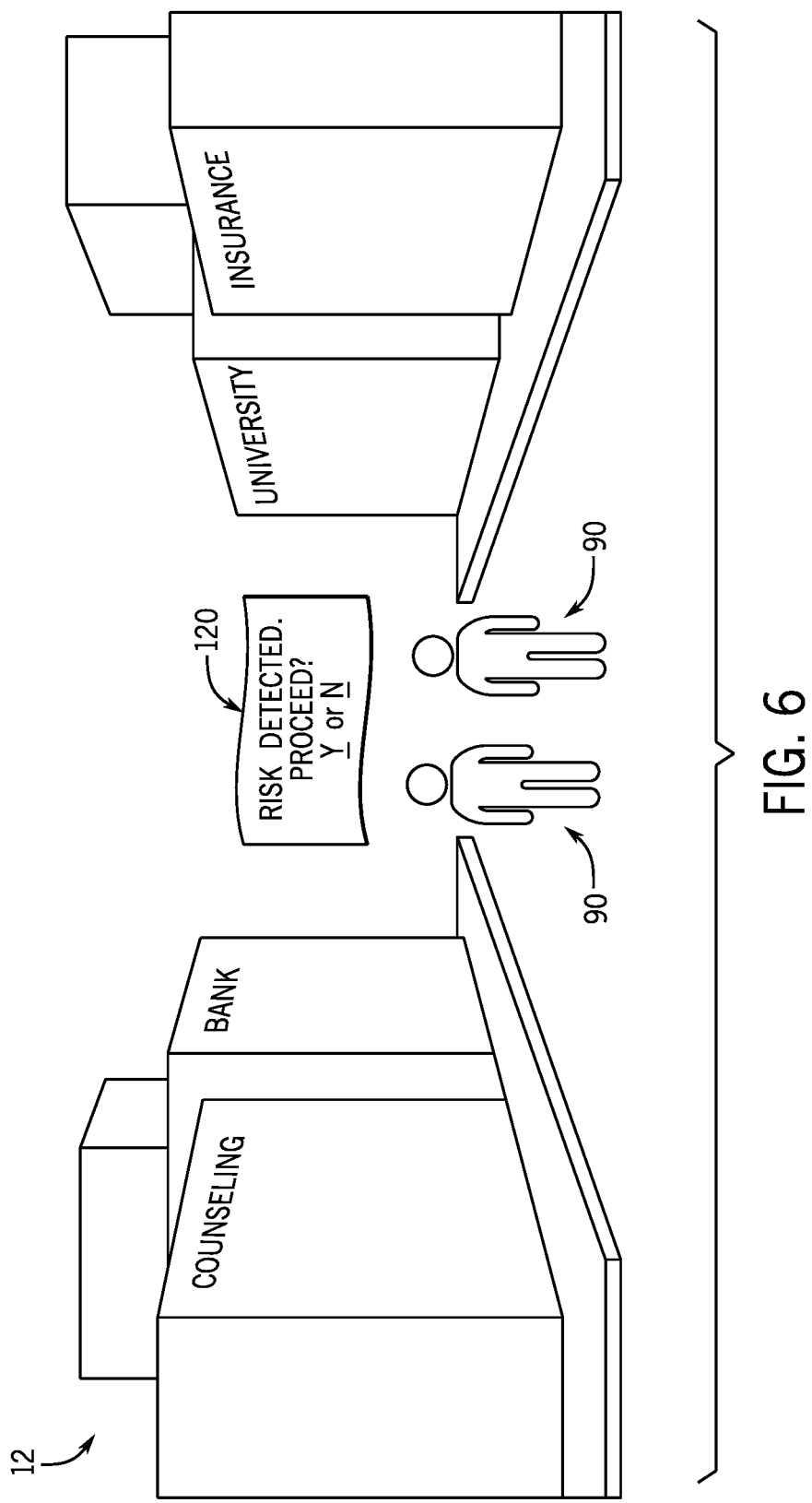
FIG. 6 illustrates a virtual message including a confirmation prompt being presented to a metaverse user, in accordance with embodiments described herein.

Aspects of this approach are shown in the schematic views of FIGS. 5 and 6. In the depicted example of FIG. 5, a prohibited transaction or data exchange has been blocked based on the privacy and protection protocols associated with a user. To provide feedback to the user 16 that a transaction they requested (or requested of them) was blocked by the privacy and protection protocols 24, a notification 120 (or other visual indication) may be displayed in association with an avatar 90 associated with the user 16 (e.g., that may be used to identify the user 16 within a metaverse 12). As will be appreciated, such a visual indicator may be displayed in the metaverse 12 so as to be visible to only the user 16 to whom the protection or privacy protocol applies, to be visible to the parties to the interaction being assessed, or to be generally visible to all parties. In addition, in certain embodiments an audible notification of approval or disapproval of the transaction may be provided in addition to or in the alternative of such visual indicators. In yet other embodiments such a notification may be delivered by an artificial intelligence (AI) maintained and operated avatar within the virtual space and that is capable of interacting with the user to deliver such warnings and/or to offer suggestions.

Turning to FIG. 6, a variation of this approach is illustrated in which the transaction or data exchange is permissible under the privacy and protection protocols 24, however a warning or confirmation is displayed in accordance with these protocols prior to the transaction proceeding. By way of example, as shown in FIG. 6, a visual notification 120 is displayed over the avatar 90 of the user in question with selectable prompts to proceed or not proceed with the transaction in view of identified risks. In this manner, a user 16 is required to affirmatively confirm that they wish to proceed despite the risks.

Figure 7:
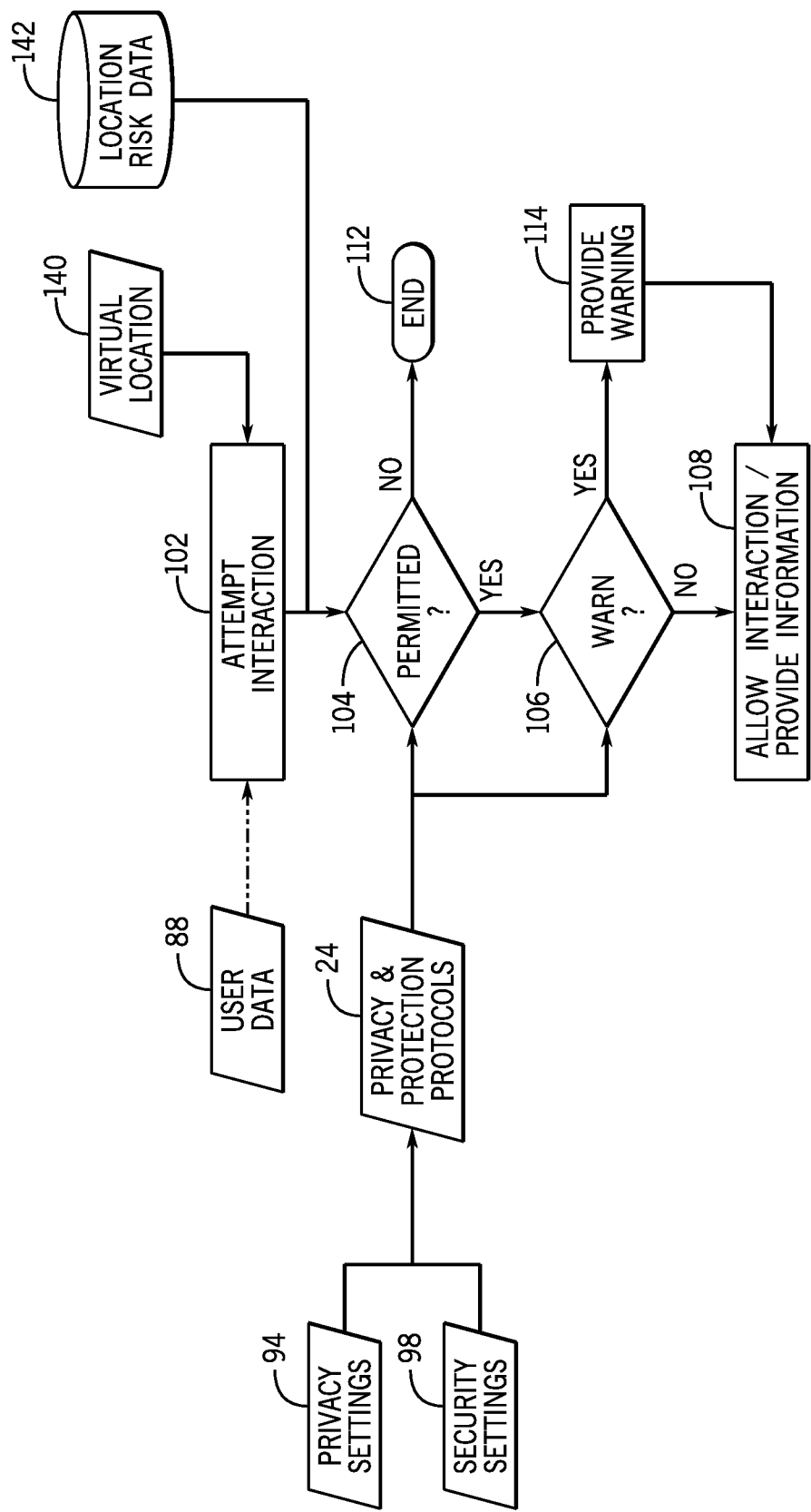
FIG. 7 depicts a process flow for implementing privacy and protection protocols within a metaverse to assess virtual locations, in accordance with embodiments described herein.

In other aspects, and as illustrated in the process flow of FIG. 7, described implementations may relate to systems and methods for limiting or prohibiting access to portions of a metaverse where user data or private information might be compromised, such as virtual storefronts, commerce sites, finance sites, and so forth that are known or reported to engage in criminal, fraudulent, or anti-social behaviors. Such limitations or prohibitions may be applied or enforced based on various factors, such as a probability or likelihood that illicit or criminal actors are active within all or part of a metaverse, privacy settings 94 and/or security settings 98 specified by a user or for the user (such as by a parent), availability or accessibility of user data 88 (or types of user data) or other private or confidential data associated with the user in the metaverse 12 in question. By way of example, such prohibitions or limitations may come into play in a transactional or commercial context, such as the purchase or sell of a good, service, or a virtual good or service within the metaverse, where one party is requesting or requiring user data 88 (such as payment, identity, and/or demographic information) that may be stolen misused. Such an attempted interaction (step 102) is illustrated in FIG. 7. In such an instance, a user 16 may be prohibited, limited, or warned from entering a portion of the metaverse (e.g., virtual location 140) where such transactions may occur or may, alternatively, receive a notification or warning related to the risk, as may be determined as decision blocks 104 and 106 in view of the privacy and protection protocols 24. As described in other embodiments herein, the privacy and protection protocols 24 may be parameterized or configured based on preset settings or based on user-configured privacy settings 94 and/or security settings 98.

In certain embodiments, and as illustrated by the decision blocks 104 and 106, different assessed risks may result in different actions, such as a low-risk assessment or low confidence in the risk resulting in a warning or notification while a high-risk assessment resulting in a prohibition or prevention of the user entering the risky area within the metaverse. By way of example, if, based on the protocols 24, the virtual location 140, and accessed location risk data 142, the virtual location 140 is determined to incur no risk, access to the virtual location may be allowed and user data 88 exchanged or released (step 108). Conversely, if a determination is made that the virtual location 140 constitutes a high-risk environment for an interaction based on the protocols 24 and risk data 142, entrance to the virtual location 140 (and any interactions to be performed at that location) is prevented (end block 112). In practice the location risk data 142 may be generated, updated, and maintained based on reports (e.g., complaints) by users 16 of the metaverse 12, criminal records, social media feeds or data, or other online sources indicative of criminal, fraudulent, or anti-social behaviors.

In the depicted example, a further, optional evaluation is depicted as occurring in the circumstance where the interaction or transaction is permitted but to further identify risky behavior that is short of the high-risk, prohibited standard. In this circumstance, a further decision (decision block 106) is performed in which a user 16 may still be warned of a risk (e.g., a low-level or tolerated risk level) to the interaction even though the interaction is permitted, thereby allowing the user to make an informed decision as to whether to proceed to the virtual location 140 or not. In this context, based on the privacy and protection protocols 24, a decision may be made to warn or not warn the user as to the presence of some degree of risk. If, per the protocols 24, no warning is justified (i.e., no-risk), the user 16 may proceed to the virtual location 140 without warning or notification. Conversely, if, per the protocols, entry to the virtual location 140 is allowed but a warning, notification, or confirmation is justified, a warning, notification, or confirmation prompt may be displayed and/or audibilized prior to the virtual location 140 being entered, thereby allowing the user 16 an opportunity to avoid the virtual location 140. As noted in the preceding, such a notification may take the form of a confirmation prompt to which the user in question must respond in the affirmative to proceed. With this in mind, it may be appreciated that separate and discrete tolerances or thresholds to risk may be provided as to whether a virtual location 140 may be entered and as to whether a warning, notification, or confirmation prompt is provided even if the entry to the virtual location 140 is permitted.

Figure 8:
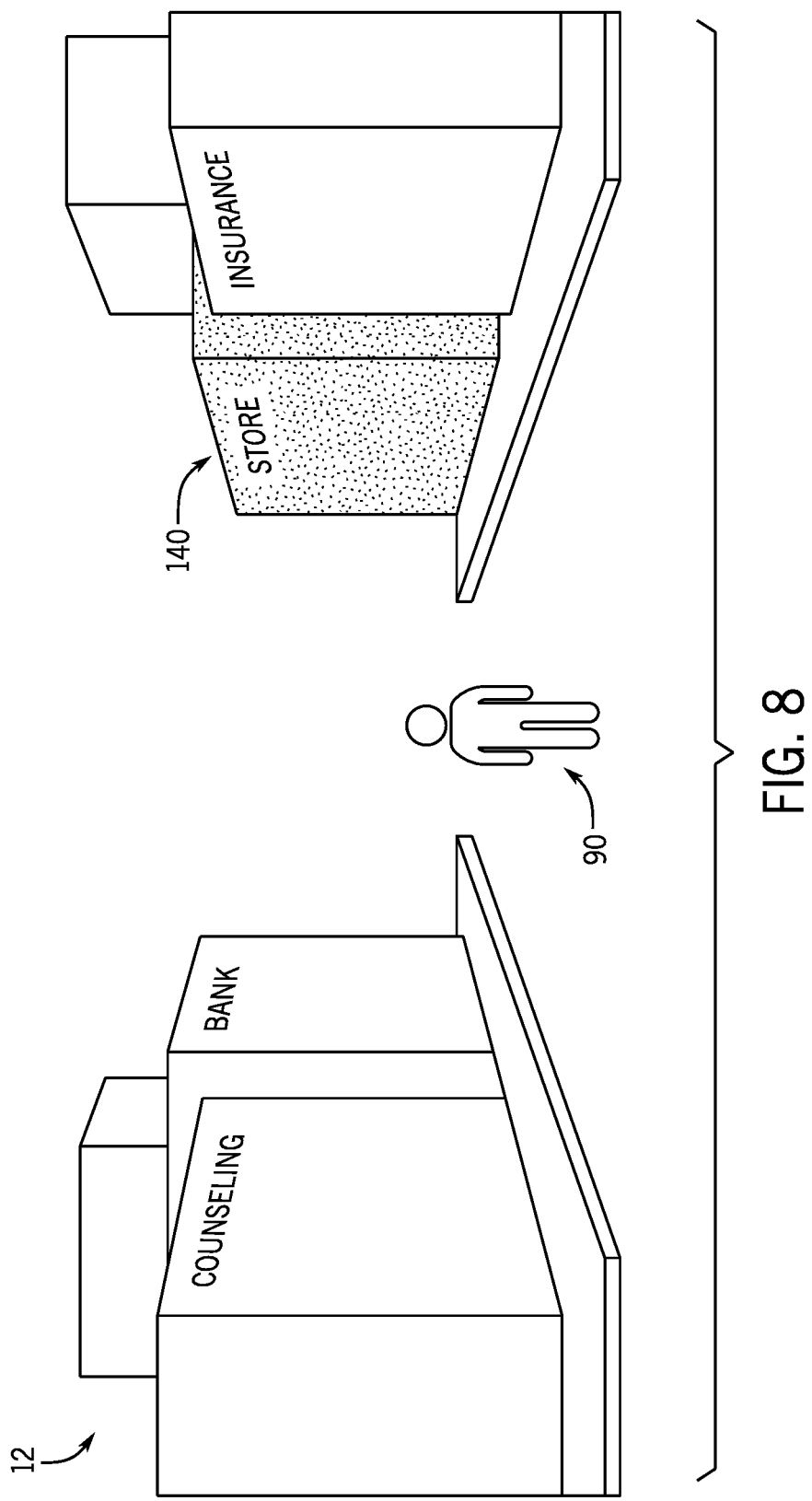
FIG. 8 illustrates a visual indication being presented to a metaverse user based on a prohibited location, in accordance with embodiments described herein.
Figure 9:
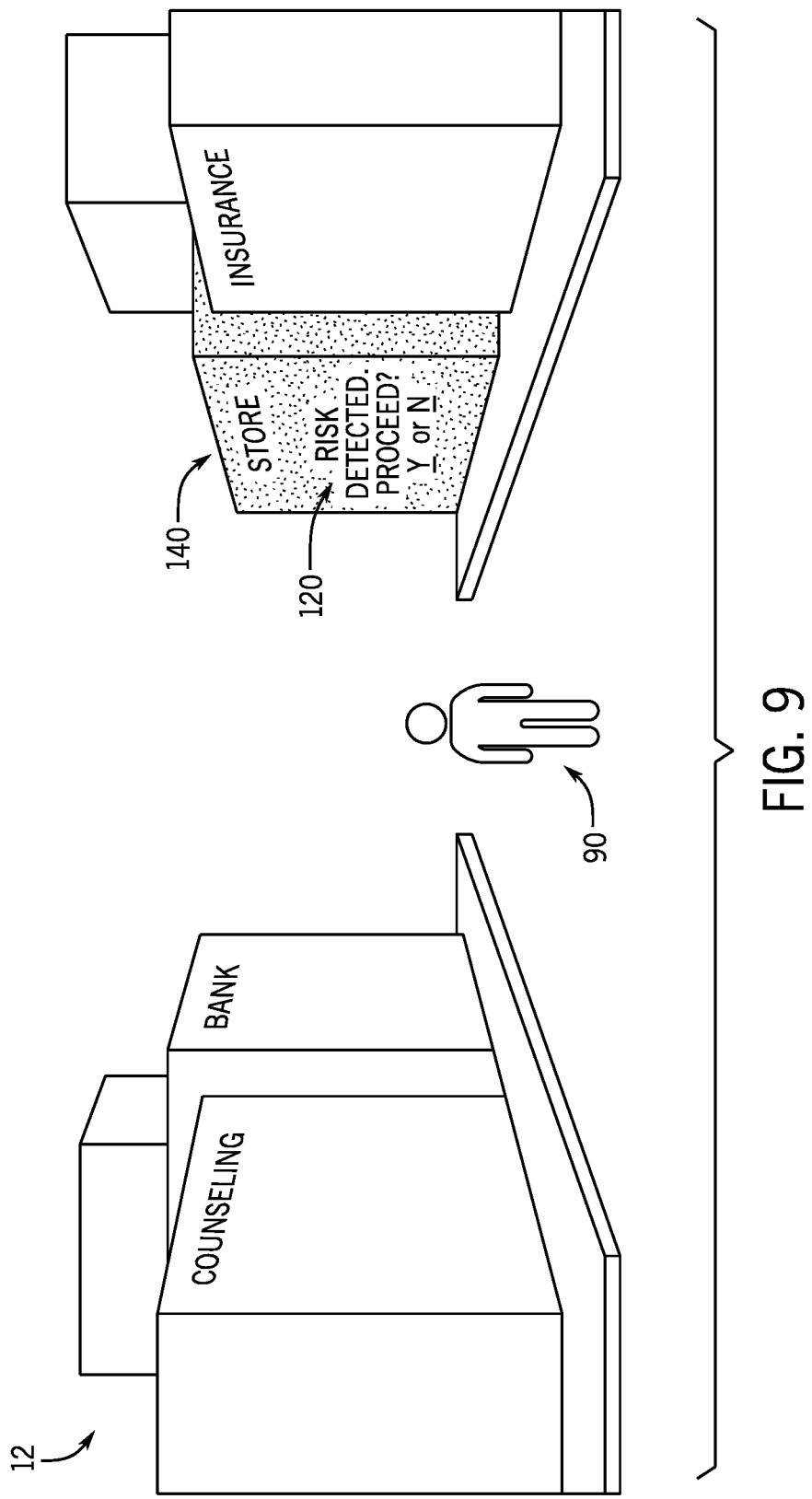
FIG. 9 illustrates a virtual message including a confirmation prompt being presented to a metaverse user, in accordance with embodiments described herein.

Aspects of this approach are shown in the schematic views of FIGS. 8 and 9. In the depicted example of FIG. 8, a prohibited virtual location 140 has been blocked based on the privacy and protection protocols 24 associated with a user 16. To provide feedback to the user 16 that entry to the virtual location 140 is prohibited by the privacy and protection protocols 24, the virtual location 140 is visually indicated (here depicted as being "greyed out") as prohibited within the display of the metaverse 12.

As will be appreciated, such a visual indication may be displayed in the metaverse 12 so as to be visible to only the user 16 to whom the protection or privacy protocol applies or to be visible to other parties as well, such as other users in a party or group with the affected user 16. In addition, in certain embodiments an audible notification may be provided if the user 16 attempts to enter the virtual location anyway. In yet other embodiments such a notification may be delivered by an AI maintained and operated avatar within the virtual space and that is capable of interacting with the user to deliver such warnings and/or to offer suggestions or alternatives.

Turning to FIG. 9, a variation of this approach is illustrated in which the entry to the virtual location transaction 140 is permissible under the privacy and protection protocols 24, however a warning or confirmation is displayed in accordance with these protocols prior to allowing the user 16 to enter. By way of example, as shown in FIG. 9, a visual notification 120 is displayed on or near the virtual location 140 in question with selectable prompts to allow the user 16 to proceed or not proceed into the virtual location in view of identified risks. In this manner, a user 16 is required to affirmatively confirm that they wish to enter the virtual location despite the risks.

In an additional context, the presently disclosed techniques may provide for the use of alerts or other notifications to provide a user 16 or visitor to a metaverse 12 with an indication of proximity (i.e., within the virtual space or area) to one or more specified conditions or actors. For example, a notification or alert may be provided if a user 16 enters an interaction or inspection proximity to another user or visitor determined to be a known or problem "bad" actor. By way of example, such a problem user may have been the subject of a threshold number of complaints or negative comments so as to be a known problem within the context of the metaverse 12 and/or may otherwise have a history or record of actions or complaints. In practice, a respective user 16 may specify, such as via one or more configurable preferences, a tolerance or threshold for certain actions or activities of such actors and/or a threshold distance or proximity at which such notifications are triggered within a given metaverse 12. By way of example, such preferences may allow different tolerances (e.g., different proximity tolerances, different tolerances based on the severity or type of the alleged prior, and so forth) to be specified for different types of bad behavior, such as criminal behavior, racist behavior, misogynistic behavior, and so forth. In other aspects, even in the absence of known indications or reports of bad behavior, other factors or conditions may be specified via preference that may trigger a warning or alert. For example, based on a specified tolerance or threshold, a warning or alert may be provided if another metaverse entity or visitor remains within a specified proximity for greater than a specified duration, which may be equated to following the user. In this manner, other visitors exhibiting behaviors that might be interpreted as following the user, or otherwise remaining close to the user for an extended duration, may trigger an alert and/or a visual indication of the potentially problematic individual.

Figure 10:
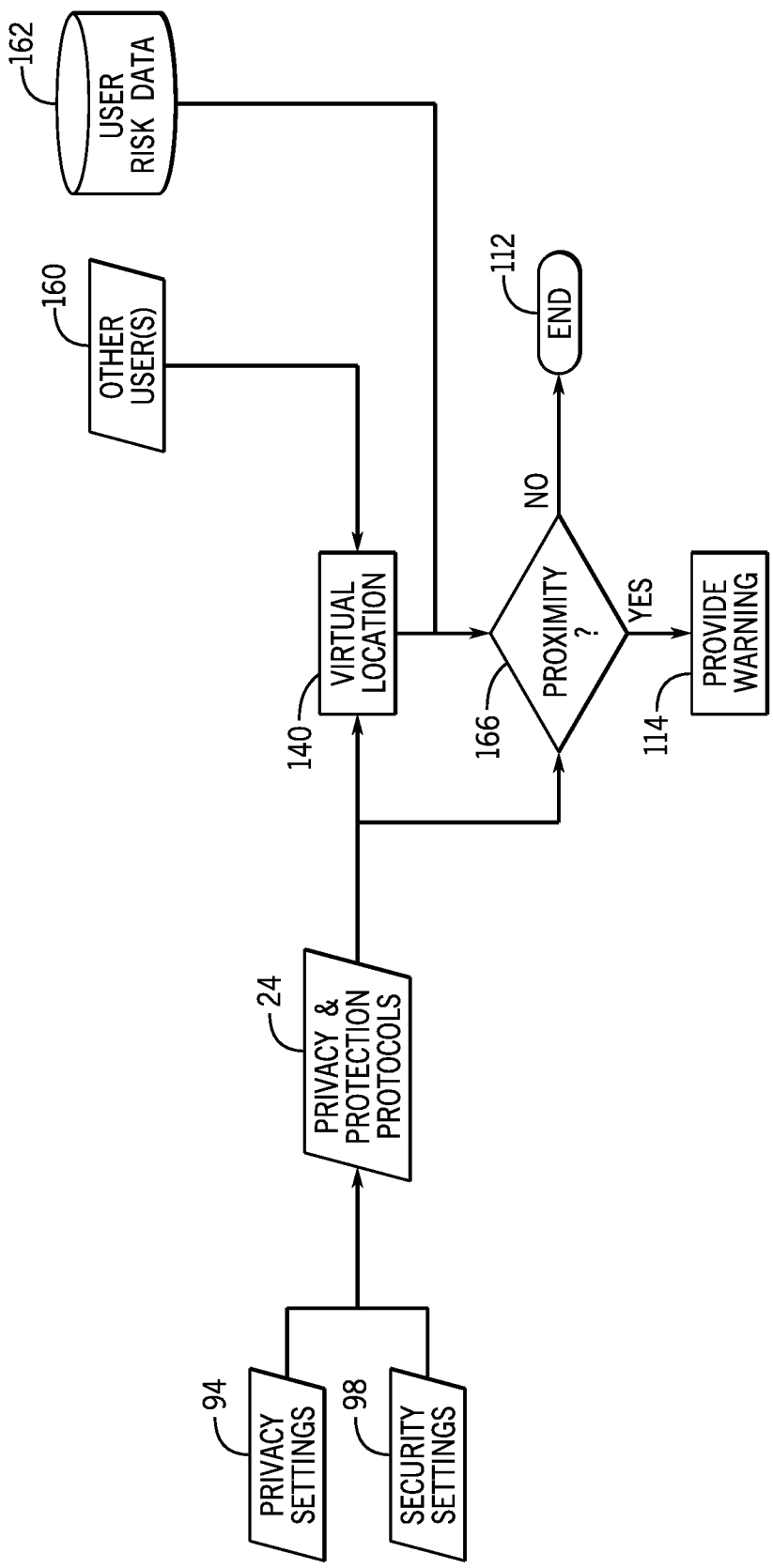
FIG. 10 depicts a process flow for implementing privacy and protection protocols within a metaverse to assess proximity of "bad" actors, in accordance with embodiments described herein.

By way of example, and turning to the process flow depicted in FIG. 10, described implementations may relate to systems and methods for providing alerts to a user 16 based on the proximity of one or more problematic users of the metaverse 12 (i.e., "bad" actors). Such alerts or notifications may be applied or enforced based on various factors, such as a probability or likelihood that a proximate user engages in or has engaged in anti-social, fraudulent, or criminal behaviors, in conjunction with the privacy settings 94 and/or security settings 98 specified by a user 16 or for the user 16 (such as by a parent). One such example is illustrated in FIG. 10. In this example a user 16 may be notified or alerted based on the proximity (i.e., a proximity threshold) of another user 160 for which there is information indicating the other user 160 is a "bad" actor in the context of the privacy and protection protocols 24 for a user. As described in other embodiments herein, the privacy and protection protocols 24 may be parameterized or configured based on preset settings or based on user-configured privacy settings 94 and/or security settings 98.

In the depicted example, proximity of the user 16 to which the privacy and protection protocols are applied to another user or users within a virtual location 140 may trigger an evaluation (decision block 166) as to whether a proximity and/or proximity duration threshold for bad actors has been met as well as a risk threshold for the other user 160. In certain embodiments, and as illustrated by the decision block 166, different assessed risks may result in different actions, such as a low-risk assessment or low confidence in no action, while a high-risk assessment may result in an alert or notification being provided to the user 16. By way of example, if, based on the protocols 24, proximity within the virtual location 140, and accessed user risk data 142, the other user 160 may be determined to incur no or low risk, resulting in no action being taken (end step 112). Conversely, if a determination is made that the other user 160 constitutes a high or threshold-meeting risk based on the protocols 24 and user risk data 162, an alert or warning may be provided (step 114) to the user 16 that they are in the presence of a bad actor. In practice the user risk data 162 may be generated, updated, and maintained based on reports (e.g., complaints) by users 16 of the metaverse 12, criminal records, social media feeds or data, or other online sources indicative of criminal, fraudulent, or anti-social behaviors. In other contexts warnings or notifications may be based on thresholds or tolerances defined by the privacy and protection protocols 24 for a duration, or a combination of proximity and duration, for which another user 160 has been proximate to the user in question or if the other user 160 appears to be following the user 16 (e.g., based on a probabilistic assessment as to whether it is likely that the other user would have remained proximate to the user for duration x if they were not following the protected user 16). In this manner, the privacy and protection protocols 24 may function primarily as a proximity sensor for the user 16 to provide notifications of suspicious activity.

Figure 11:
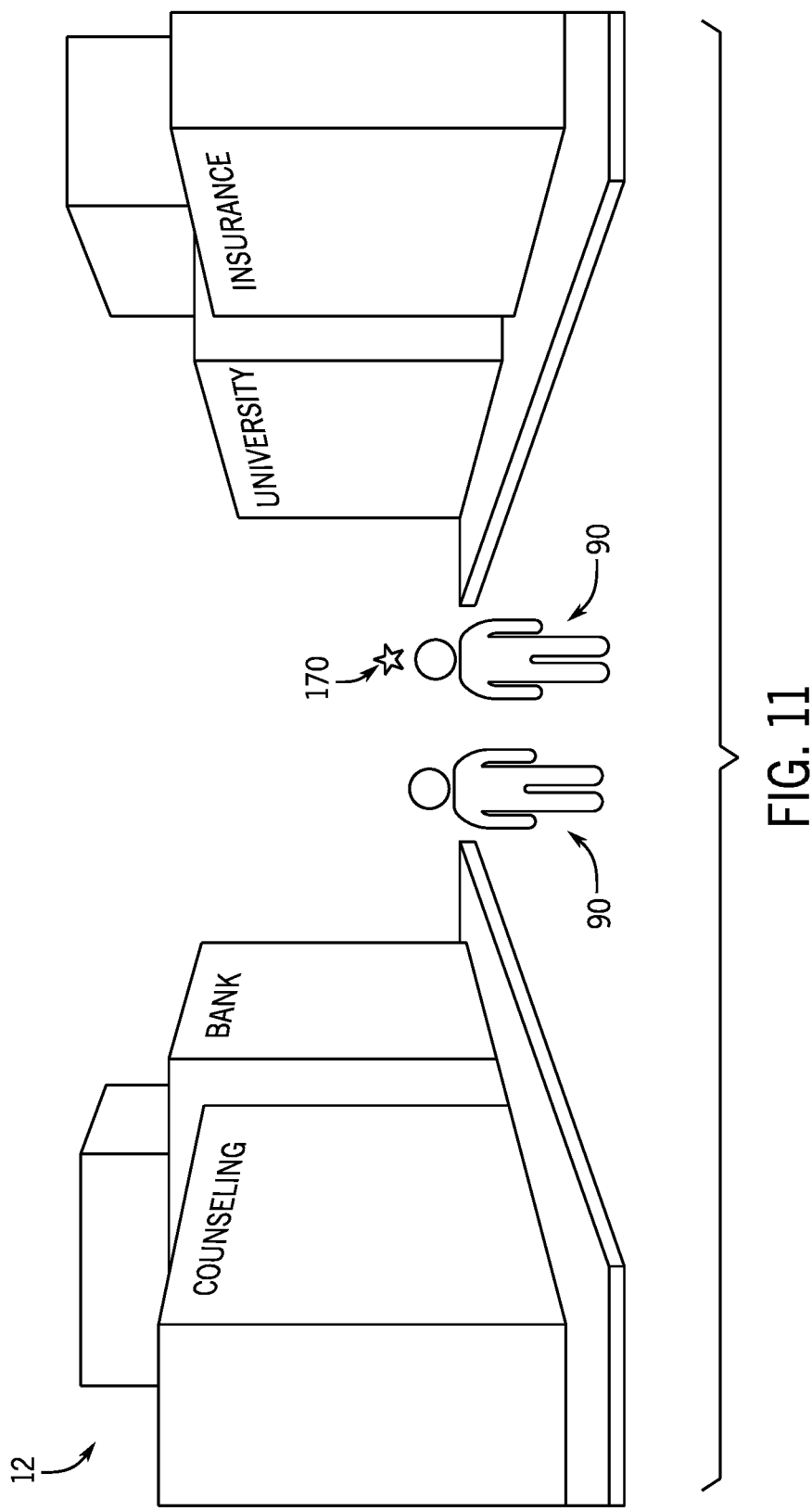
FIG. 11 illustrates a visual indication being presented to a metaverse user based on proximity to a "bad" actor, in accordance with embodiments described herein.

Aspects of this approach are shown in the schematic view of FIG. 11. In the depicted example of FIG. 11, another user that has been determined to be a bad actor is illustrated as being within a proximity threshold (e.g., an interaction or inspection distance) with a user 16 to whom privacy and protection protocols 24 are applied. To provide feedback to the user 16 that a known or suspected "bad" actor is in proximity, a visual indicator 170 may be displayed proximate to the bad actor or some other visual cue may be displayed (e.g., providing a shading to the bad actor's respective avatar, and so forth). As will be appreciated, such a visual indicator may be displayed in the metaverse 12 so as to be visible to only the user 16 to whom the protection or privacy protocol applies or to be visible to other parties or users within the metaverse. In addition, in certain embodiments an audible notification indicative of proximity to a bad actor may be provided in addition to or in the alternative of such visual indicators. In yet other embodiments such a notification may be delivered by an artificial intelligence (AI) maintained and operated avatar within the virtual space and that is capable of interacting with the user to deliver such warnings and/or to offer suggestions.

While the preceding example relates to providing proximity notification of a bad actor to a user, in other embodiments the privacy and protection protocols 24 may affirmatively protect the user 16 by blocking interactions with the known or suspected bad actor(s). Such a protection service may prevent or limits available interactions initiated by one or both of the user and the bad actor so as to protect the user. Such a service may be configurable so as to provide a desired degree of protection, such as to prevent all interactions, to prevent monetary or commercial interactions, to prevent exposure of identifying or personal data, and so forth. Similarly, such interactions may be configurable so as to allow a user to specify the degree of protection (i.e., to scale the protection) based on characteristics of the bad actor. For example, all interactions may be prevented with an actor known to engage in criminal behavior, while limited or optional interactions may be allowed with bad actors not known to be criminal in nature or otherwise exhibiting behaviors short of criminal but reported as being problematic (such as actors known for engaging in anti-social behaviors or in risky, but non-criminal, behaviors). Similarly, the degree or extent of protection may be scaled based on a user-specified tolerance or threshold for the bad behaviors in question and/or based on a certainty or statistical confidence that the actor in question has engaged in the bad behaviors. In certain embodiments, by way of example, a user may be protected from a bad actor by rendering the user "invisible" to the bad actor within the metaverse (e.g., manipulating the display parameters within the metaverse so as not to display the user to the bad actor) and/or by re-instancing the user or the bad actor to a different virtual server instance.

In certain embodiments, the protection configuration or decision may be based entirely or in part on a status flag or indicator (e.g., a visible "check mark" or an invisible status flag) for the actor in question (e.g., a "verified", "certified", or "secured" status), which may be stored as part of user risk data 162 as discussed in greater detail below. By way of example, such a status indicator may be procured or otherwise obtained through a bond-type interaction, such as a monetary interaction in which the actor provides a cash or credit security deposit or fee so as a guarantee of their identity or good behavior, where the fee or deposit may be forfeit in the event of a report of criminal, illicit, or antisocial behavior. Such an approach may be useful in the context of a public or free-to-enter metaverse in which the barrier to entry is low for a bad actor, and thus they incur little to no cost if removed. In this manner, a cost of entry and guarantee of good behavior may be imposed on the actor in question so as to make bad behavior no longer cost-free. Similar approaches for guaranteeing or certifying the identify of an actor may include providing an indicator of good or certified status based on a known relationship within the metaverse, such as being a verified customer of a service or entity operating in the metaverse, such as a financial institution (e.g., bank or insurance company), educational institution (e.g., university or school), governmental entity, and so forth. In such instances the certifying entity may have performed one or more identity checks, such as password and/or two-factor authentication, so that the actor is known and traceable. In practice, such a verified or bonded actor may be assumed to be safe with respect to protection decisions for a respective user or visitor to the metaverse, barring additional factors or determinations.

Figure 12:
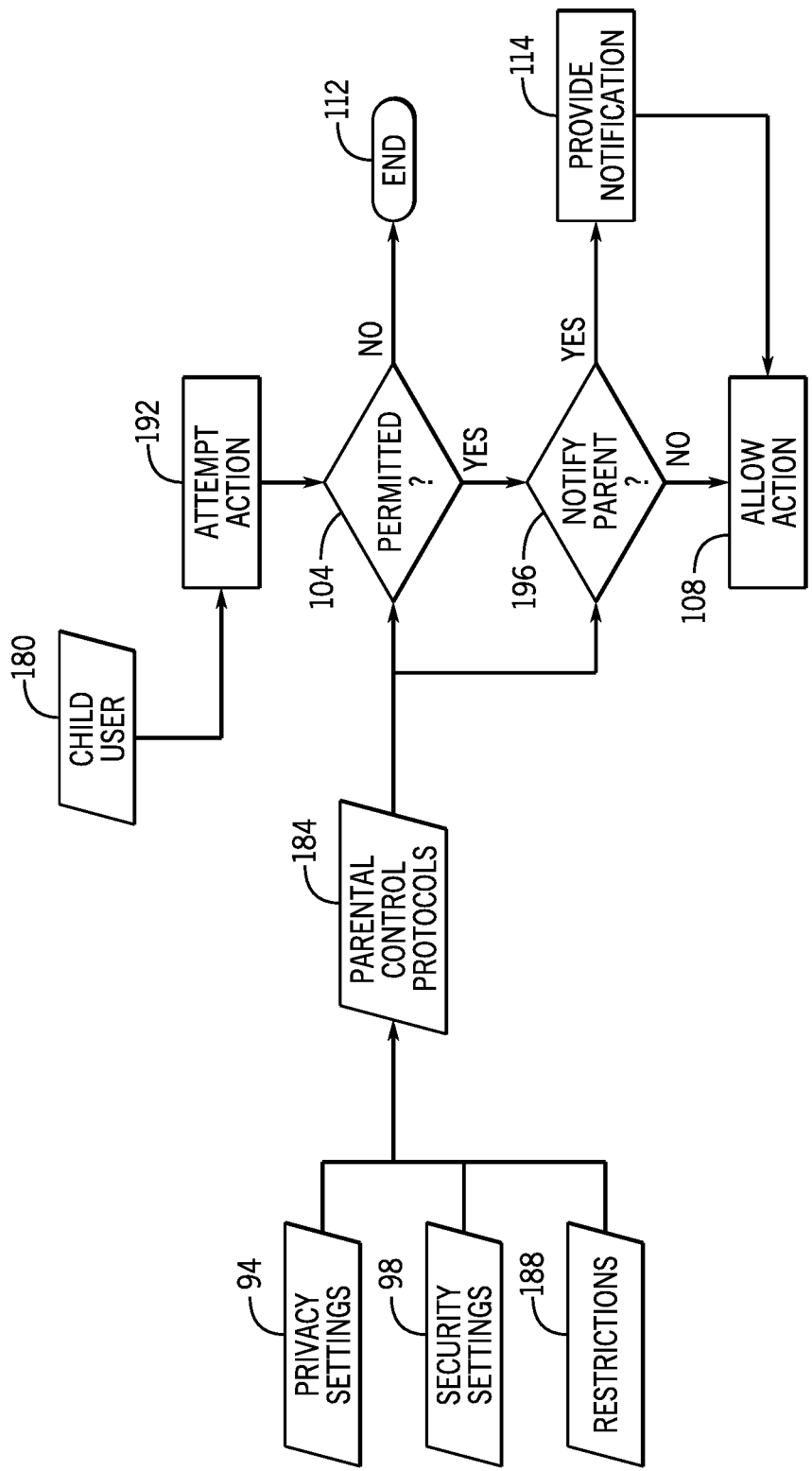
FIG. 12 depicts a process flow for implementing parental control protocols within a metaverse, in accordance with embodiments described herein.

By way of example, and turning to the process flow illustrated in FIG. 12, described implementations may relate to systems and methods for limiting or prohibiting interactions between a user 16 and one or more bad actors known or reported to engage in criminal, fraudulent, or anti-social behaviors within the metaverse 12. Such limitations or prohibitions may be applied or enforced based on various factors, such as a probability or likelihood that a given actor engages in illicit or criminal behavior within all or part of a metaverse as well as privacy settings 94 and/or security settings 98 specified by a user or for the user (such as by a parent). By way of example, such prohibitions or limitations may come into play in an interactional context. Such an attempted interaction (step 102) is illustrated in FIG. 12. In such an instance, a user 16 may be prohibited, limited, or warned from interacting with another user 160 determined to be, or to likely be, a bad actor (e.g., engaging in criminal, fraudulent, and/or anti-social behaviors), as may be determined as decision blocks 104 and 106 in view of the privacy and protection protocols 24. As described in other embodiments herein, the privacy and protection protocols 24 may be parameterized or configured based on preset settings or based on user-configured privacy settings 94 and/or security settings 98.

In certain embodiments, and as illustrated by the decision blocks 104 and 106, different assessed risks may result in different actions, such as a low-risk assessment or low confidence in the risk resulting in a warning or notification while a high-risk assessment resulting in a prohibition or prevention of the user entering into an interaction with the other user 160 within the metaverse. By way of example, if, based on the protocols 24, the other user 160 and accessed user risk data 162, the other user 160 is determined to pose no risk, the interaction may be allowed to proceed (step 108) without interruption or warning. Conversely, if a determination is made that the other user 160 constitutes a high-risk based on the protocols 24 and user risk data 162, the attempted interaction may be prevented (end block 112). In practice the user risk data 162 may be generated, updated, and maintained based on reports (e.g., complaints) by users 16 of the metaverse 12, criminal records, social media feeds or data, or other online sources indicative of criminal, fraudulent, or anti-social behaviors. Alternatively, and as described herein, in certain instances the user risk data 162 may certify or verify the other user 160 or otherwise vouch for their character or identity, such as based on a known relationship within the metaverse 12 (e.g., being a customer of a service or entity operating in the metaverse, such as a financial institution (e.g., bank or insurance company), educational institution (e.g., university or school), governmental entity, and so forth. In such instances the certifying entity may have performed one or more identity checks, such as password and/or two-factor authentication, so that the actor is known and traceable. In practice, such a verified or bonded actor may be assumed to be safe with respect to protection decisions for a respective user or visitor to the metaverse, barring additional factors or determinations. Correspondingly, in certain instances such verification may act to verify another user 160 as a "good" actor, and therefore okay for the user 16 to interact with.

In the depicted example, a further, optional evaluation is depicted as occurring in the circumstance where the interaction or transaction is permitted but to further identify risky behavior that is short of the high-risk, prohibited standard. By way of example, the other user 160 may be determined to be a bad actor at a first threshold (e.g., a low-risk or a warning or notification threshold) but not at a second threshold (e.g., a high-risk or no interaction threshold). In this circumstance, a further decision (decision block 106) is performed in which a user 16 may still be warned of a risk (e.g., a low-level or tolerated risk level) with respect to the other user 160 even though the interaction is permitted, thereby allowing the user 16 to make an informed decision as to whether to interact with the other user 160 or not. In this context, based on the privacy and protection protocols 24, a decision may be made to warn or not warn the user 16 as to the presence of some degree of risk. If, per the protocols 24, no warning is justified (i.e., no-risk), the user 16 may proceed to interact with the other user 160 without warning or notification. Conversely, if, per the protocols, interaction with the other user 160 is allowed but a warning, notification, or confirmation is justified, a warning, notification, or confirmation prompt may be displayed and/or audibilized prior to interacting with the other user 160, thereby allowing the user 16 an opportunity to avoid risky interactions. As noted in the preceding, such a notification may take the form of a confirmation prompt to which the user in question must respond in the affirmative to proceed. With this in mind, it may be appreciated that separate and discrete tolerances or thresholds to risk may be provided as to whether an interaction with another user 160 may be performed and as to whether a warning, notification, or confirmation prompt is provided even if the interaction is permitted.

In a related context, such configurable protection services may be implemented not in a "bad" actor framework, but instead as a configurable parental control service. By way of example, and with reference to the process flow depicted in FIG. 12, for a child user 180 or visitor to a metaverse 12, a parent or guardian may configure one or more parental control protocols 184 or limitations to protect the child 180 within the metaverse 12. By way of example, such a parental control framework may establish differing levels of privilege for a child user 180 to interact with a metaverse 12, such as establishing restrictions 188 on purchases or other commercial transactions (or triggering an approval prompt for the parent to interact with so as to limit un-approved purchases by the child), restrictions 188 on interactions with other visitors to the metaverse 12 or entities represented in the metaverse 12 (e.g., stores, banks, schools, and so forth), restrictions 188 on interactions with bots or other automated accounts or entities, restrictions 188 on interactions with non-verified accounts (as described herein) or other potential fake accounts, restrictions 188 on what personal information may be shared within the metaverse 12 (e.g., user identifying information, contact information, or other personal information), restrictions 188 on what information the child user 180 may request or otherwise access or ask for within the metaverse 12 (e.g., user identifying information, contact information, or other personal information), restrictions 188 on where the child may travel or move within the metaverse 12 (e.g., restricted or limited access areas), restrictions 188 on how long the child may remain in the metaverse, and so forth. In certain implementations the restrictions 188 may be configured based on an age of the child such that a restriction 188 or control may change over time as the child ages. An activity report may be generated based on the child's activities within the metaverse in addition or in the alternative to the restrictions 188 described above. Similarly, the parental control framework may provide guidance, instruction, or education to the child based on the configures settings and the activity of the child user 180, such as providing visual or audible guidance or notifications within the metaverse when a restriction 188 is triggered. By way of example, certain actions by the child user 180 may trigger a tutorial or other educational presentation as to a danger or risk within the metaverse 12, such as disclosure of personal information, and so forth. In this manner a child user 180 may be instructed in what activities are dangerous, warning signs to watch for, and why the restricted actions are dangerous or are otherwise restricted. As may be appreciated different activities or content may have separate configurable parental controls, such as limited purchase activity (e.g., below a certain cost threshold) may be permitted for a child user 180 while all interactions with other, non-child visitors to the metaverse may be prohibited or may trigger a warning. In addition, some or all of the activity of the child user 180 within the metaverse 12 may be recorded for subsequent review by a parent or guardian.

For example, as illustrated in the process flow of FIG. 12, a high-level example is provided that is applicable to systems and methods for managing or providing parental controls in a metaverse 12 and/or to providing protection of a child user 180 within metaverses 12. In particular, in certain embodiments, a metaverse parental control system may be used to monitor or limit activities of the child user 180 within the metaverse 12. Such limitations may be applied or enforced as part of implemented parental control protocols 184 based on various factors, such as, but not limited to: privacy settings 94 or security settings 98 specified by policy or by a parent or guardian of the child user 180 as well as restrictions 188 (e.g., restrictions on who the child user 180 may interact with within the metaverse 12, restrictions on where the child user 180 may go within a given metaverse 12, restriction on purchases or commercial transactions within the metaverse 12, and so forth) that may be preset or configures by the parent or guardian. A further factor or consideration may be the age of the child user 180, which may be tracked over time so as to allow certain of the restrictions 188 to "age out" or otherwise become inapplicable over time.

By way of example, such restrictions 188 and other prohibitions or limitations may come into play when the child user 180 attempts to perform an action (step 192) within the metaverse 12, such as attempting to interact with another user, attempting to purchase a good or service, attempting to enter a virtual location within the metaverse 12, and so forth. In such an instance, the child user 180 may be prohibited, limited, or warned from entering into or otherwise engaging in the attempted action or a parent or guardian may be notified, as may be determined as decision blocks 104 and 196 in view of the parental control protocols 184, which may be parameterized based on the preset or user-configured restrictions, 188, privacy settings 94 and/or security settings 98. If, based on the protocols 184, the attempted action is permitted (decision block 104), the action may be allowed (step 196). Conversely, if a determination is made that the attempted action is not permitted based on the protocols 184, the action is prevented or terminated (end block 112).

In the depicted example, a further, optional evaluation is depicted as occurring in the circumstance where the action may be permitted with parental or guardian approval. In this circumstance, a further decision (decision block 196) is performed in which a notification or approval prompt may be provided (step 114) to the parent or guardian for approval or refusal, thereby allowing the parent or guardian to make an informed decision as to whether to allow the child user 180 to perform the attempted action or not. In this context, based on the parental control protocols 184, a decision may be made by the parent or guardian based on the potential risks. If, per the parental control protocols 184, no notification or approval is justified, the action may proceed. Conversely, if, per the parental control protocols 184, the action is allowable with approval, a confirmation prompt may be displayed and/or audibilized at a device (e.g., a cell phone or computer) utilized by the parent or guardian prior to the child user 180 being allowed to perform the action, thereby allowing the parent or guardian an opportunity to prevent the action. As noted in the preceding, such a notification may take the form of a confirmation prompt to which the parent or guardian must respond in the affirmative to allow the child user 180 to proceed. With this in mind, it may be appreciated that separate and discrete tolerances or thresholds may be provided as to whether an action might be allowed but also as to whether a confirmation prompt is provided even if the action is allowable.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims. It should be appreciated that any of the features and embodiments described herein may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

The invention claimed is:

1. A method, comprising:
monitoring, via a metaverse privacy and protection system implementing privacy and protection protocols, one or more attempted interactions attempted by a metaverse user within a metaverse, wherein the one or more attempted interactions comprise accessing or entering a virtual location within the metaverse and attempting an interaction with another metaverse user, wherein determining whether accessing or entering the virtual location is permitted comprises accessing location risk data for the virtual location, and wherein the location risk data comprises one or more of:
reports by users of the metaverse;
criminal records;
social media feeds, or
online sources indicative of criminal, fraudulent, or anti-social behaviors;
determining, via the metaverse privacy and protection system, whether the one or more attempted interactions are permitted by the privacy and protection protocols, wherein determining whether the interaction with the other metaverse user is permitted comprises accessing user risk data for the other metaverse user, and wherein the user risk data comprises certifications or verifications for one or more of the other metaverse users;
based on a determination that the one or more attempted interactions are permitted, enabling the attempted interaction; and
determining, via the metaverse privacy and protection system, whether one or more of a notification, an alert, or a confirmation prompt will be provided to the metaverse user.

2. The method of claim 1, wherein the privacy and protection protocols comprise privacy settings configured by the metaverse user or a parent or guardian of the metaverse user.

3. The method of claim 1, wherein the privacy and protection protocols comprise security settings configured by the metaverse user or a parent or guardian of the metaverse user.

4. The method of claim 1, wherein the one or more attempted interactions further comprise transmission of user data of the metaverse user.

5. The method of claim 4, wherein the user data comprises one or more of financial, monetary, or credit data related to the metaverse user, identity data related to the metaverse user, or demographic data related to the metaverse user.

6. The method of claim 1, further comprising:
displaying a visual indication within the metaverse to inform the metaverse user that a respective attempted interaction has been prevented.

7. The method of claim 1, further comprising:
based on a determination that the one or more attempted interactions are not permitted, preventing the attempted interaction.

8. A method, comprising:
monitoring, via a metaverse privacy and protection system implementing privacy and protection protocols, presence of other metaverse users within a respective virtual location of the metaverse in which a metaverse user is present, wherein the privacy and protection protocols comprise privacy settings configured by the metaverse user or a parent or guardian of the metaverse user, wherein the privacy settings comprise a risk threshold based on preset settings, and wherein the risk threshold is parameterized and is configured to be scaled based on a user-specified tolerance for one or more bad behaviors;
determining, via the metaverse privacy and protection system, whether one or more of the other metaverse users meets the risk threshold and is within a proximity threshold based on the privacy settings; and
based on a determination that the one or more of the other metaverse users meets the risk threshold and is within the proximity threshold, providing a notification or alert to the metaverse user.

9. The method of claim 8, wherein the privacy and protection protocols further comprise security settings configured by the metaverse user or a parent or guardian of the metaverse user.

10. The method of claim 8, wherein determining whether one or more of the other metaverse users meets the risk threshold and is within the proximity threshold further comprises a time duration threshold.

11. The method of claim 8, wherein determining whether one or more of the other metaverse users meets the risk threshold comprises accessing user risk data for the one or more other metaverse users.

12. The method of claim 11, wherein the user risk data comprises one or more of prior reported criminal conduct, fraudulent conduct, or anti-social behavior.

13. A method, comprising:
- monitoring, via a metaverse privacy and protection system implementing parental control protocols, one or more attempted interactions attempted or performed by a metaverse user within a metaverse, wherein the metaverse user is a child having a parent or guardian, wherein the parental control protocols comprise one or both of privacy settings or security settings configured by the parent or guardian, wherein one or both of the privacy settings or the security settings are parameterized based on preset settings, and wherein the preset settings are configured to be scaled based on a user-specified tolerance for one or more bad behaviors;
- determining, via the metaverse privacy and protection system, whether the one or more attempted interactions are permitted by the parental control protocols; and
- based on a determination that a respective attempted interactions is not permitted, preventing the respected attempted interaction.

14. The method of claim 13, wherein the parental control protocols further comprise restrictions configured by the parent or guardian.

15. The method of claim 14, wherein the restrictions are age-based.

* * * * *